US006649250B2

(12) United States Patent
Laney et al.

(10) Patent No.: US 6,649,250 B2
(45) Date of Patent: Nov. 18, 2003

(54) GLOSS COATING ON PERMEABLE SURFACE IMAGING SUPPORT

(75) Inventors: Thomas M. Laney, Spencerport, NY (US); Cathy Fleischer, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 3 days.

(21) Appl. No.: 09/976,616

(22) Filed: Oct. 11, 2001

(65) Prior Publication Data

US 2003/0077468 A1 Apr. 24, 2003

(51) Int. Cl.$^{7}$ .......................... B32B 3/10; B32B 27/08; B32B 27/20; B32B 27/30; B32B 27/36

(52) U.S. Cl. ....................... 428/195; 428/480; 428/483; 428/212; 428/213; 428/215; 428/216; 428/334; 428/336; 428/339; 428/304.4; 428/317.9; 428/318.4; 428/319.3; 428/319.7

(58) Field of Search ................................ 428/480, 212, 428/213, 215, 216, 334, 336, 339, 195, 483, 304.4, 317.9, 319.3, 318.4, 319.7

(56) References Cited

U.S. PATENT DOCUMENTS

| | | | | | |
|---|---|---|---|---|---|
| 3,944,699 | A | | 3/1976 | Mathews et al. | |
| 4,340,639 | A | | 7/1982 | Toyoda et al. | |
| 4,350,655 | A | | 9/1982 | Hoge | |
| 4,377,616 | A | | 3/1983 | Ashcraft et al. | |
| 4,472,227 | A | | 9/1984 | Toyoda et al. | |
| 4,483,965 | A | | 11/1984 | Ohba et al. | |
| 4,496,620 | A | | 1/1985 | Park et al. | |
| 4,582,752 | A | | 4/1986 | Duncan | |
| 4,632,869 | A | | 12/1986 | Park et al. | |
| 4,681,803 | A | | 7/1987 | Liu | |
| 4,698,372 | A | | 10/1987 | Moss | |
| 4,699,744 | A | | 10/1987 | Nakadate et al. | |
| 4,701,369 | A | | 10/1987 | Duncan | |
| 4,701,370 | A | | 10/1987 | Park | |
| 4,702,954 | A | | 10/1987 | Duncan | |
| 4,704,323 | A | | 11/1987 | Duncan et al. | |
| 4,758,462 | A | | 7/1988 | Park et al. | |
| 4,770,931 | A | | 9/1988 | Pollock et al. | |
| 4,780,364 | A | | 10/1988 | Wade et al. | |
| 4,780,402 | A | | 10/1988 | Remmington | |
| 4,814,124 | A | | 3/1989 | Aoyama et al. | |
| 4,871,784 | A | | 10/1989 | Otonari et al. | |
| 4,877,679 | A | | 10/1989 | Leatherman et al. | |
| 4,879,078 | A | | 11/1989 | Antoon, Jr. | |
| 4,960,637 | A | | 10/1990 | Biczenczuk | |
| 4,983,447 | A | | 1/1991 | Crass et al. | |
| 5,028,480 | A | | 7/1991 | Dean | |
| 5,084,334 | A | | 1/1992 | Hamano et al. | |
| 5,141,685 | A | | 8/1992 | Maier et al. | |
| 5,143,765 | A | | 9/1992 | Maier et al. | |
| 5,178,943 | A | | 1/1993 | Asai et al. | |
| 5,223,383 | A | | 6/1993 | Maier et al. | |
| 5,275,854 | A | | 1/1994 | Maier et al. | |
| 5,326,391 | A | | 7/1994 | Anderson et al. | |
| 5,422,175 | A | | 6/1995 | Ito et al. | |
| 5,605,750 | A | | 2/1997 | Romano et al. | |
| 6,096,684 | A | * | 8/2000 | Sasaki et al. | 503/227 |
| 6,338,891 | B1 | * | 1/2002 | Kawasaki et al. | 428/195 |
| 6,379,780 | B1 | * | 4/2002 | Laney et al. | 428/195 |
| 6,383,983 | B1 | * | 5/2002 | Sasaki et al. | 503/227 |
| 6,472,053 | B1 | * | 10/2002 | Hoshino et al. | 428/195 |
| 6,489,008 | B1 | * | 12/2002 | Campbell et al. | 428/195 |
| 2001/0004487 | A1 | * | 6/2001 | Kaneko et al. | 428/195 |
| 2001/0009174 | A1 | * | 7/2001 | Dinkel et al. | 156/238 |
| 2001/0023014 | A1 | * | 9/2001 | Patel et al. | 428/195 |

FOREIGN PATENT DOCUMENTS

| | | |
|---|---|---|
| EP | 0 322 771 A2 | 7/1989 |
| EP | 0 672 536 A2 | 9/1995 |
| EP | 0 756 941 A2 | 2/1997 |
| WO | WO 89/08023 | 9/1989 |
| WO | WO 98/32541 | 7/1998 |

OTHER PUBLICATIONS

WPI Abstract Acc. No. 88–225065 & JP 94089160 B2.
WPI Abstract Acc. No. 88–318765 & JP 96005978 B2.

* cited by examiner

*Primary Examiner*—Vivian Chen
(74) *Attorney, Agent, or Firm*—Sarah Meeks Roberts

(57) ABSTRACT

This invention relates to an imaging element comprising a base polyester layer, an absorbent polyester layer above said base layer, and a glossy polymer layer above said absorbent layer; wherein said element has a 60° Gardner gloss greater than 30% wherein said glossy polymer layer has openings comprising between 5.0 and 10.0% of the surface area

19 Claims, No Drawings

GLOSS COATING ON PERMEABLE SURFACE IMAGING SUPPORT

FIELD OF THE INVENTION

The present invention relates generally to an opaque image-recording element and, more particularly, the present invention relates to a recording element for an automated printing assembly such as a computer-driven ink-jet printer having excellent ink-receiving properties and high gloss.

BACKGROUND OF THE INVENTION

In a typical ink-jet recording or printing system, ink droplets are ejected from a nozzle at high speed towards a recording element or medium to produce an image on the medium. The ink droplets, or recording liquid, generally comprise a recording agent, such as a dye, and a large amount of solvent in order to prevent clogging of the nozzle. The recording agent can also be a pigment. The solvent, or carrier liquid, typically is made up of water, an organic material such as a monohydric alcohol or a polyhydric alcohol or a mixed solvent of water and other water miscible solvents such as a monohydric alcohol or a polyhydric alcohol. The recording elements or media typically comprise a substrate or a support material having on at least one surface thereof an ink-receiving or image-forming layer. The elements include those intended for reflection viewing, which usually have an opaque support, and those intended for viewing by transmitted light, which typically have a transparent support.

While a wide variety of different types of image-recording elements have been proposed heretofore, there are many unsolved problems in the art and many deficiencies in the known products which have severely limited their commercial usefulness. The requirements for an image-recording medium or element for ink-jet recording are very demanding. For example, the recording element must be capable of absorbing or receiving large amounts of ink applied to the image-forming surface of the element as rapidly as possible in order to produce recorded images having high optical density, good color gamut, and fast dry times.

One example of an opaque image-recording element is described in U.S. Pat No. 5,326,391. It consists of a layer of a microporous material which comprises a matrix consisting essentially of a substantially water-insoluble thermoplastic organic polymer, such as a linear ultra-high molecular weight polyethylene, a large proportion of finely divided water-insoluble filler of which at least about 50 percent by weight is siliceous, and interconnecting pores. The porous nature of the image-recording element disclosed in U.S. Pat. No. 5,326,391 allows inks to penetrate the surface of the element to produce text and/or graphic images. However, the cost of producing these elements is relatively high. Also, the image density has been found to be of poor quality, ie., the images have low optical densities and poor color gamut. U.S. Pat. No. 5,605,750 describes an element which addresses the latter shortcomings of image density and color gamut via the application of an upper image-forming layer. This upper image forming layer is a porous, pseudo-boehmite having an average pore radius of from 10 to 80 Å. Such an element, however, has a high manufacturing cost to form the absorbent layer. This is due to the requirements for a porous substrate such as described in U.S. Pat. No. 5,326,391.

U.S. application Ser. No. 09/472,487, filed Dec. 27, 1999, describes an open celled, voided support made via coextrusion which provides an opaque image-recording element suitable for use in an ink-jet printer, and which is capable of recording images (including color images) having fast dry times, high optical densities and good color gamut, but which is also capable of being manufactured at a relatively low manufacturing cost. However, the support described in said patent application has a matte surface due to the protrusions in the top layer external surface. Said protrusions are created by the void initiating fillers near the surface during the stretching process. It is desirable to obtain a glossy surface for a “photo quality” ink jet print, while maintaining fast dry time.

PROBLEM TO BE SOLVED BY THE INVENTION

There remains a need for an image-receiving member that has rapid absorption of ink and has a glossy surface(60 degree gloss>30%) and which can be manufactured at a relatively low cost.

SUMMARY OF THE INVENTION

This invention provides an imaging element comprising a base polyester layer, an absorbent polyester layer above said base layer, and a glossy polymer layer above said absorbent layer; wherein said element has a 60° Gardner gloss greater than 30%. In a preferred embodiment the element has an ink absorbency rate resulting in a dry time of less than 10 seconds and a total absorbent capacity of at least 14.0 $cm^3/m^2$.

ADVANTAGEOUS EFFECT OF THE INVENTION

The imaging element of the invention has numerous advantages over the prior practices in the art which have been described in U.S. application Ser. No. 09/472,487, filed Dec. 27, 1999, the entire disclosure of which is incorporated herein by reference. The additional advantage claimed by this invention is that a glossy surface is obtained on an otherwise matte surface. The imaging element of this invention may be made on readily available polyester film formation machines. The imaging element preferably are made in one step with the absorbent layer and the bottom base layer being co-extruded, stretched, and integrally connected during formation. The imaging elements are low in cost, as the one pass formation process leads to low manufacturing cost. The imaging elements have rapid absorption of ink, as well as high absorbent capacity, which allows rapid printing and short dry time. Short dry time is advantageous, as the prints are less likely to smudge and have higher image quality as the inks do not coalesce prior to drying. The imaging elements have the look and feel of paper, which is desirable to the consumer. The imaging element is weather resistant and resistant to curling under differing humidity conditions. The imaging elements further have high resistance to tearing and deformation.

DETAILED DESCRIPTION OF THE INVENTION

As used herein the terms “top”, “above”, “upper” refer to the side or toward the side of the imaging element on which the ink is applied. The terms “lower”, “below” and “bottom” refer to the side or toward the side of the imaging element opposite to that to which the ink is applied.

The layers of the element of this invention have levels of voiding, thickness, and smoothness adjusted to provide optimum ink absorbency and stiffness. Preferably the layers are co-extruded. The polyester sheet has a voided layer to efficiently absorb the printed inks commonly applied to ink-jet imaging supports without the need of multiple processing steps and multiple coated layers. The polyester base layer of the invention provides stiffness to the imaging element of the invention. It also provides physical integrity to the highly voided absorbing layer. The thickness of the base layer is chosen such that the total imaging element thickness is 50 to 500 $\mu$m depending on the required stiffness of the element. However, the thickness of the absorbent polyester layer is adjusted to the total absorbent capacity of the medium. A thickness of at least 28.0 $\mu$m is needed to achieve a total preferred absorbency of at least 14 cc/m$^2$. The preferred thickness is between 30 and 60 $\mu$m. Preferably the absorbent capacity is between 14 and 30 cc/m$^2$. The rate at which inks are absorbed into the absorbent layer is critical as discussed hereinbefore. The voiding should be such that the voids are interconnected or open-celled. This type of structure enhances the ink absorption rate by enabling capillary action to occur. The element of the described invention has an absorbent layer with an absorbing rate resulting in a dry time of less than 10 seconds. This dry time is measured by printing a color line on the side of the top layer with an ink-jet printer at a laydown of approximately 15 cm$^3$/m$^2$ utilizing typical inks of the following formulation:

| Ink | Water | 2-Pyrrolidone | Diethylene glycol | 1.5 Pentanediol | EHMP | Dyes |
|---|---|---|---|---|---|---|
| Cyan | 76% | 6% | ND | 8.6% | 7.7% | 1.7% |
| Magenta | 75% | 7.8% | ND | 8.5% | 7.5% | 1.2% |
| Yellow | 81% | 4.2% | 4.3% | ND | 8.2% | 1.3% |

Where: EHMP = 2-ethyl-2-(hydroxymethyl)-1,3-propanediol

This may be accomplished utilizing an HP Photo-Smart ink-jet printer using standard a HP dye-based ink cartridge (HP # C3844A & C3845A) with the printed lines running in the direction of the sheet as it is conveyed through the printer. Dry time is measured by superposing a fresh printing paper on top of the printed line pattern immediately after printing and pressing the papers together with a roller press. If a particular printed line transfers to the surface of the fresh paper, its transferred length L can be used for estimating the dry time $t_D$ using a known linear transport speed S for the printer based on the formula $$t_D = \frac{L}{S}$$

In a preferred embodiment of the invention, the ink absorbency rate results in a measured dry time of less than 1 second. The thickness of the voided layer should be such as to enable at least 14.0 cm$^3$ of ink to be absorbed per 1 m$^2$. The actual thickness can be determined by using the formula t=14.0/v where v is the void volume fraction defined as the ratio of voided thickness minus unvoided thickness to the voided thickness. The unvoided thickness is defined as the thickness that would be expected had no voiding occurred.

Due to the voiding of the absorbing layer, the surface of the image-recording element described would normally be rough and have a matte appearance. This problem is overcome, however, by the application of a coated polymer layer over the voided layer which results in a smooth layer with pores comprising less than 10% of the surface area, and preferably comprising between 5.0% and 10.0% of the surface area. This layer is aqueous or solvent coated over the cast film prior to stretching. During stretching the microbeads in the voided layer protrude at the surface of the voided layer. The coated layer stretches over these protrusions resulting in a smoother top surface than would occur without the coated layer. At the peak of the protrusions caused by the microbeads, a thinning of the coated layer occurs resulting in occasional rupture of the coated surface-forming pores. These pores, which cover less than 10% of the total coated area, maintain the absorptivity of the voided layer. The smooth surface which covers greater than 90% of the coated area enhances the gloss of the image-recording element. Typically the final thickness of the glossy polymer layer should be less than 0.4 $\mu$m in order to achieve the 10% or less pore area to maintain dry time. The thickness is preferably between 0.1 and 0.3 $\mu$m. Preferably the imaging element has a 60 degree Gardner gloss greater than 30%, and more preferably between 30% and 50%.

The choice of glossy layer polymer is limited to polymers which adhere to the absorbent layer and have a break elongation at the stretching temperature used which is greater than the stretch ratio used. Examples of such polymers are polyesters, polyvinylalcohols, polyvinylpyrrolidone, and polyurethanes. Preferably the polymer may be an aqueous dispersible polyester or a blend thereof. Polyester ionomers and blends of such with polyvinylpyrrolidone are particularly preferred. One such polyester ionomer is Eastek 1100 from Eastman Chemicals (Knoxville, Tenn.). Eastek 1100 is a water-dispersible polyester ionomer synthesized from addition polymers of isophthalic acid and sodium sulfo-isophthalic acid, along with diethylene glycol and 1,4-cyclohexane dimethanol.

Small particle pigments can also be included in the glossy polymer layer to help aid in gloss. Examples of such pigments are colloidal silica or fumed alumina.

The polyester utilized in the absorbent layer should have a glass transition temperature between about 50° C. and 150° C., preferably 60–100° C., should be stretchable, and have an inherent viscosity of at least 0.50, preferably 0.6 to 0.9 dl/g. Suitable polyesters include those produced from aromatic, aliphatic, or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexane-dicarboxylic, sodiosulfoisophthalic, and mixtures thereof. Examples of suitable glycols include ethylene glycol, propylene glycol, butanediol, pentanediol, hexanediol, 1,4-cyclohexane-dimethanol, diethylene glycol, other polyethylene glycols and mixtures thereof. Such polyesters are well known in the art and may be produced by well-known techniques, e.g., those described in U.S. Pat. Nos. 2,465,319 and 2,901,466. Preferred continuous matrix polymers are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607; 4,459,402; and 4,468,510.

The base layer is substantially impermeable. In its preferred embodiment this base layer is comprised of poly (ethylene terephthalate) and its copolymers, which are lowest in cost and readily available.

Suitable particles for the microbeads used for void generation in the absorbent layer during sheet formation are either commercially available inorganic fillers or polymerizable organic materials. The size of the microbeads is preferably in the range of 0.01 to 10 $\mu$m, preferably 0.7 to 5.0 $\mu$m. Typical inorganic materials are silica, alumina, calcium carbonate, and barium sulfate. Typical polymeric organic materials are polystyrenes, polyamides, fluoro polymers, polycarbonates, or polyolefins. The microbeads are at least partially bordered by voids. The void space in the supports should occupy at least 40%, preferably 50–70%, by volume of the absorbent layer. At this level of voiding the voids have been shown to be interconnected or open-celled. Any less voiding results in a closed cell structure, which does not lend itself to capillary action and thus fast ink absorbency rate is not achievable. Depending on the manner in which the supports are made, the voids may completely encircle the microbeads, e.g., a void may be doughnut-shaped (or flattened doughnut) encircling a microbead, or the voids may only partially surround the microbeads, e.g., a pair of voids may border a microbead on opposite sides.

During stretching the voids assume characteristic shapes from the balanced biaxial orientation of paperlike films to the uniaxial orientation of microvoided/satinlike fibers. Balanced microvoids are largely circular in the plane of orientation, while fiber microvoids are elongated in the direction of the fiber axis. The size of the microvoids and the ultimate physical properties depend upon the degree and balance of the orientation, temperature and rate of stretching, crystallization kinetics, the size distribution of the microbeads, and the like.

The film supports according to this invention are preferably prepared by:

(a) forming a mixture of molten continuous matrix polymer and microbeads uniformly dispersed throughout the matrix polymer (b) forming a two-layered sheet from the mixture by co-extrusion of material in (a) with a base polyester layer and casting said sheet on a chill roll, (c) coating a glossy polymer layer on said cast coextruded sheet over the layer containing microbeads and drying (d) orienting the cast sheet by stretching to form voids in the layer containing microbeads at least partially bordering the microbeads on sides thereof in the direction, or directions of orientation.

The mixture may be formed by forming a melt of the matrix polymer and mixing therein the microbeads. When using microbeads of the cross-linked polymer, it may be in the form of solid or semisolid microbeads. Due to the incompatibility between the matrix polymer and cross-linked polymer, there is no attraction or adhesion between them, and they become uniformly dispersed in the matrix polymer upon mixing.

After the microbeads are uniformly dispersed in the polymer matrix the resin is used to form a layered film structure by the co-extrusion process. Any one of the known techniques for coextruding cast polymer sheets can be employed. Such forming methods are well known in the art. Typical coextrusion technology is taught in W. J. Schrenk and T. Alfrey, Jr, "Coextruded Multilayer Polymer Films and Sheets," Chapter 15, Polymer Blends, p. 129–165, 1978, Academic Press; and D. Djorjevic, "Coextrusion," Vol. 6, No. 2, 1992, Rapra Review Reports.

Coating of the glossy layer can be achieved by any of the known coating methods in the art. The polymer coating formulation can be dispersed as finely divided particles in an aqueous-dispersion medium which is then used as a coating liquid for the formation of the gloss layer. The polymer of the present invention may be prepared by emulsion polymerization, that is, obtained as an aqueous dispersion of particulate emulsion polymerizate, a so-called latex. In addition, the polymer may be an aqueous-dispersible polymer, such as an aqueous-dispersible polyester. The polymer may also be aqueous soluble, such as poly(vinyl alcohol), or the like. A part of the water may be replaced by a water-miscible organic solvent (e.g., methanol or acetone). A coating aide is typically added to aide in wetting the polyester support.

Aqueous compositions containing the present polymers used in the glossy layer are preferably used in such a manner that the polymer prepared as an aqueous dispersion according to the aforementioned alternate methods is diluted, if necessary, with water or a water-miscible organic solvent so that the solids concentration in the diluted dispersion of said polymer may become 1–20 weight %. The mode of using the present composition may vary depending on the purpose for which said composition is used and on the coating technique employed therefor. The aqueous compositions may contain a variety of additives besides the above-mentioned polymer. For instance, the aqueous compositions may comprise, in order to improve dispersibility of polymer particles or coatability of the composition at the time of coating, anionic surface active agents such as alkali metal or ammonium salts of alcohol sulfuric acid of 8 to 18 carbon atoms; ethanolamine lauryl sulfate; ethylaminolauryl sulfate; alkali metal and ammonium salts of paraffin oil; alkali metal salts of aromatic sulfonic acid such as dodecane-1-sulfonic acid, octadiene-1-sulfonic acid or the like; alkali metal salts such as sodium isopropylbenzene-sulfate, sodium isobutylnaphthalenesulfate or the like; and alkali metal or ammonium salts of esters of sulfonated dicarboxylic acid such as sodium dioctylsulfosuccinate, disodium dioctadecylsulfosuccinate or the like; nonionic surface active agents such as saponin, sorbitan alkyl esters, polyethyl oxides, polyoxyethylene alkyl ethers or the like; cationic surface active agents such as octadecyl ammonium chloride, trimethyldosecyl ammonium chloride or the like; and high molecular surface active agents other than those above mentioned such as polyvinyl alcohol, partially saponified vinyl acetates, maleic acid containing copolymers, gelatin or the like. Further, additives which may be incorporated into the present aqueous composition include inorganic pigments such as titanium oxide, silicon oxide, colloidal silica, zinc oxide, aluminum oxide, etc., matting agents comprising particles of polymers such as polymethyl methacrylate, etc., antistatic agents comprising inorganic salts or copolymers and, according to the purpose for which the present aqueous composition is used, dyes or pigments for coloring purposes and alkali or acid for adjusting a pH value of the present polymer-containing composition.

It is also possible to use coalescing aides, more preferably phenolic or naphtholic type compounds (in which one or more hydroxy groups are substituted onto an aromatic ring), for example, phenol, resorcinol, orcinol, catechol, pyrogallol, 2–4-dinitrophenol, 2,4,6-dinitrophenol, 4-chlororesorcinol, 2–4-dihydroxy toluene, 1,3-naphthalenediol, the sodium salt of 1-naphthol-4-sulfonic acid, o-fluorophenol, m-fluorophenol, p-fluorophenol, o-cresol, p-hydroxybenzotrifluoride, gallic acid, 1-naphthol, chlorophenol, hexyl resorcinol, chloromethylphenol, o-hydroxybenzotrifluoride, m-hydroxybenzotrifluoride, and the like, and mixtures thereof. Chloromethylphenol is especially preferred for use with glycidyl-functional homopolymers. Other coalescing agents include acrylic acid, benzyl alcohol, trichloroacetic acid, chloral hydrate, ethylene carbonate, and combinations of the foregoing. Typically, the concentration of the coalescing aide is about 5–30%, by weight of solids, preferably 10–20% in the glossing layer.

The aqueous polymeric composition of the present invention is usually coated and dried on the cast coextruded sheet at a coverage of approximately 0.3–3 g of polymer solids per $m^2$ of support and, in this case, the conventional coating technique is applicable, for example, dip coating, roll coating, spray coating, or the like. Subsequent drying is then done to evaporate off the carrier and leave a continuous polymer layer on the cast sheet.

It is important that the cast, laminated sheet be subsequently oriented by stretching in at least one direction. Methods of unilaterally or bilaterally orienting sheet or film material are well known in the art. Basically, such methods comprise stretching the sheet or film at least in the machine or longitudinal direction, after it is cast on a chill roll, by an amount of about 1.5–4.5 times its original dimension. Such sheet or film may also be stretched in the transverse or cross-machine direction by apparatus and methods well known in the art, in amounts of generally 1.5–4.5 times the original dimension. Stretching to these ratios is necessary to sufficiently void the top layer and to achieve desired levels of thickness uniformity and mechanical performance. Such apparatus and methods are well known in the art and are described, for example, in U.S. Pat. No. 3,903,234. The final dry coverage of the polymer gloss layer after stretching ranges from 30 mg/$m^2$ to 300 mg/$m^2$ based on the weight of the polymer. When the amount is less than the above, the gloss promoting effect is small.

The element as heretofore described can be coated on the top layer with an ink receiving layer commonly used which contains mordanting agents to hold the ink dyes close to the top surface of the support. Said ink receiving layer may also contain UV absorbers and the like. Such layers are generally very thin and do not significantly reduce the absorbency rates of the support under said receiving layer. Preferably the ink receiving layer would comprise silica particles in a polyvinyl alcohol matrix. One preferred ink jet receiving layer is described in U.S. application Ser. No. 09/650,069 filed Aug. 29, 2000.

Ink jet inks used to image the recording elements of the present invention are well known in the art. The ink compositions used in ink jet printing may be dye or pigment based and typically are liquid compositions comprising aqueous, non-aqueous, or mixed solvents, as well as other additives such as humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543; and 4,781,758, the disclosures of which are hereby incorporated by reference.

The following examples illustrate the practice of this invention. They are not intended to be exhaustive of all possible variations of the invention. Parts and percentages are by weight unless otherwise indicated.

EXAMPLES

Example 1

A two-layered film laminate comprising an impermeable base polyester layer and an absorbing top polyester layer is prepared in the following manner: The materials used in the preparation of the laminate are: 1) a poly(ethylene terephthalate) (PET) resin (IV=0.70 dl/g ) for the base layer; 2) a compounded blend consisting of 32% wt PETG 6763 resin (IV=0.73 dl/g) (an amorphous polyester resin available from Eastman Chemical Company) and 68% wt of Barium Sulfate with a mean particle size of 0.8 μm for the voided layer. The Barium Sulfate (Blanc Fixe XR from Sachtleben) was compounded with the PETG resin through mixing in a counter-rotating twin screw extruder attached to a pelletizing die. The resins were dried at 65° C. and fed by two plasticating screw extruders into a co-extrusion die manifold to produce a two-layered melt stream which was rapidly quenched on a chill roll after issuing from the die. By regulating the throughputs of the extruders, it was possible to adjust the thickness ratio of the layers in the cast laminate sheet. In this case, the thickness ratio of the two layers was adjusted at 1:1 with the thickness of the absorbing layer being approx. 500 μm. The cast sheet was then aqueous coated with a water dispersible polyester (Eastek 1100, Eastman Chemical Company), of the following formulation:

15% Eastek 1100

0.2% Saponin balance water

After coating it was dried to a thickness of 3.0 μm. The cast sheet was then first oriented in the machine direction by stretching at a ratio of 3.3 and a temperature of 110° C. The oriented sheet was then stretched in the transverse direction at a ratio of 3.3 and a temperature of 100° C. In this example no heatsetting treatment was applied. The final total film thickness was 100 μm with the permeable layer being 50 μm, and the coated layer approximately 0.3 μm and the layers within the film were fully integrated and strongly bonded. The stretching of the heterogeneous filled layer created interconnected microvoids around the hard barium sulfate particles, thus rendering this layer opaque (white) and highly porous and permeable. The PET base layer, however, was impermeable and retained its natural clarity. The coated layer created a smooth surface on the top layer with holes formed in the coated layer around the protrusions formed by the barium sulfate particles at the surface. Said holes covered less than 10% of the top layer exposed surface area. The stretched film was then cut to fit a HP 722 printer and printed using cyan, yellow, magenta, and black stripes. The printed image was sharp, smudge-free without bleed and dye migration throughout the image. Dry time was measured by the method previously described and was <1 sec. The surface gloss on the coated side was determined by the 60 degree Gardner gloss measurement to be 32%.

Example 2 (Comparative)

Same as Example 1 except no coating was applied to the cast sheet prior to stretching. The dry time for this film was also <1 second. However, the 60 degree Gardner gloss was only 8.6%.

Example 3

Same as Example 1 except the coated layer formulation was as follows:

12% Eastek 1100

3% Polyvinylpyrrolidone 0.2% Saponin balance water

The dry time for this film was also <1 second. The pores in the coating covered approximately 8% of the total coated area. The 60 degree Gardner gloss was 62%.

Example 4

Same as Example 1 except the coated layer formulation was as follows:

4% Silica

11% Poly(vinyl alcohol)

0.2% Saponin balance water

The dry time for this film was <1 second. The pores in the coating covered approximately 10% of the coated area. The 60 degree Gardner gloss was 31%.

Example 5 (Comparative)

Same as Example 1 except the coated layer formulation was as follows:

7.5% Silica 7.5% Poly(vinyl alcohol)

0.2% Saponin balance water

The dry time for this film was <1 second. Many cracks were observed in the coating with no evidence of small pores. The 60 degree Gardner gloss was 13%. This indicated that the break elongation of the polymer at the stretch temperature was less than the stretch ratio used. This resulted in a cracked coating with no gloss enhancement.

The invention has been described in detail with particular reference to certain preferred embodiments thereof, but it will be understood that variations and modifications can be effected within the spirit and scope of the invention.

What is claimed is:

1. An imaging element comprising a base polyester layer, an absorbent polyester layer above said base layer, and a glossy polymer layer above said absorbent layer; wherein said element has a 60° Gardner gloss greater than 30%, wherein said glossy polymer layer has openings comprising between 5.0 and 10.0% of the surface area, and wherein said element has a dry time of less than 10 seconds.

2. The imaging element of clam 1 wherein the break elongation of said glossy polymer layer at the stretching temperature used during the stretching process to form said element is greater than the stretch ratio used to form said element.

3. The imaging element of claim 1 wherein the dried thickness of the glossy polymer layer of the support is less than 0.4 μm.

4. The imaging element of claim 1 wherein the glossy polymer layer comprises an aqueous dispersible polyester or blend thereof.

5. The imaging element of claim 4 wherein the glossy polymer layer includes pigment particles.

6. The imaging element of claim 5 wherein the pigment is colloidal silica or fumed alumina.

7. The imaging element of claim 1 wherein said element absorbs dye based ink with either an aqueous, non-aqueous, or mixed solvent.

8. The imaging element of claim 1 wherein said element absorbs ink comprising pigment based ink with either an aqueous, non-aqueous, or mixed solvent.

9. The imaging element of claim 1 wherein said element has a total absorbent capacity of at least 14 $cc/m^2$.

10. The imaging element of claim 1 wherein said absorbent polyester layer comprises voids formed utilizing void-forming particles having a diameter of between 0.7 and 5 μm.

11. The imaging element of claim 1 wherein the dried thickness of the glossy polymer layer is between 0. 1 μm and 0.3 μm.

12. The imaging element of claim 1 wherein said absorbent polyester layer has a thickness of between 30.0 μm and 60.0 μm.

13. The imaging element of claim 1 wherein said glossy polymer layer comprises a polyester ionomer.

14. The imaging element of claim 1 wherein said glossy polymer layer comprises a polyester ionomer and polyvinylpyrrolidone.

15. The imaging element of claim 1 wherein said element has a 60° Gardner gloss of between 30 and 50%.

16. The imaging element of claim 1 wherein said imaging element has a total absorbent capacity of between 14 and 30 $cc/m^2$.

17. The imaging element of claim 1 further comprising a dye-receiving layer above said glossy polymer layer.

18. The imaging element of claim 17 wherein said dye-receiving layer comprises silica particles in a polyvinyl alcohol polymer matrix.

19. An imaging element comprising a base polyester layer, an absorbent polyester layer above said base layer, and a glossy polymer layer above said absorbent layer; wherein said element has a 60° Gardner gloss greater than 30%, wherein said glossy polymer layer has openings comprising between 5.0 and 10.0% of the surface area, and wherein the glossy polymer layer is applied to the absorbent layer prior to stretching.

* * * * *